(12) United States Patent  (10) Patent No.: US 8,587,850 B2
Miyamoto  (45) Date of Patent: Nov. 19, 2013

(54) IMAGE PROCESSING APPARATUS, IMAGE PROCESSING METHOD AND IMAGE SCANNING APPARATUS

(75) Inventor: Yusuke Miyamoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 239 days.

(21) Appl. No.: 13/240,651

(22) Filed: Sep. 22, 2011

(65) Prior Publication Data

US 2012/0081767 A1 Apr. 5, 2012

(30) Foreign Application Priority Data

Sep. 30, 2010 (JP) ................................. 2010-221073

(51) Int. Cl.
*H04N 1/04* (2006.01)
(52) U.S. Cl.
USPC ............ 358/505; 358/521; 358/538; 358/474
(58) Field of Classification Search
USPC .................... 358/505, 521, 538, 474
See application file for complete search history.

(56) References Cited

U.S. PATENT DOCUMENTS

| 8,345,119 B2 * | 1/2013 | Makino et al. | 348/222.1 |
| 2003/0197880 A1 | 10/2003 | Nakao | |

FOREIGN PATENT DOCUMENTS

| JP | 11-96975 A | 8/1989 |
| JP | 9-186875 A | 7/1997 |
| JP | 9-186876 A | 7/1997 |
| JP | A-2000-30037 | 1/2000 |
| JP | A-2004-70659 | 3/2004 |
| JP | 2005-260530 A | 9/2005 |
| JP | A-2006-157356 | 6/2006 |
| JP | A-2008-199366 | 8/2008 |

OTHER PUBLICATIONS

Notification of Reasons for Refusal dated Jul. 31, 2012 received from the Japanese Patent Office from related Japanese Application No. 2010-221073, together with an English-language translation.

* cited by examiner

*Primary Examiner* — Houshang Safaipour
(74) *Attorney, Agent, or Firm* — Scully, Scott, Murphy & Presser, PC

(57) ABSTRACT

An image processing apparatus including: a determining unit that determines whether a background color area of an image data is adjacent to a non-background color area of an image data outside of the background color area, the non-background color area including a pixel having color data of a first color; and a converting unit that converts color data of a pixel in the background color area into the first color when the determining unit determines that the background color area is not adjacent to the non-background color area, and converts the color data of the pixel in the background color area into a second color which is different from the first color when the determining unit determines that the background color area is adjacent to the non-background color area.

8 Claims, 11 Drawing Sheets

IMAGE PROCESSING APPARATUS, IMAGE PROCESSING METHOD AND IMAGE SCANNING APPARATUS

CROSS-REFERENCE TO RELATED APPLICATIONS

This application claims priority from Japanese Patent Application No. 2010-221073 filed on Sep. 30, 2010, the entire contents of which are incorporated herein by reference.

TECHNICAL FIELD

Aspects of the present invention relate to an image processing apparatus, an image processing method and an image scanning apparatus.

BACKGROUND

A variety of technologies for converting a background color of image data into another color have been suggested.

For example, an image processing apparatus disclosed in JP-A-2005-260530 detects background color information of a document, based on an image signal obtained after detecting a leading end of the document, and reduces the detected background color information.

However, according to the image processing apparatus disclosed in JP-A-2005-260530, when a document having white letters on a black background is scanned, the black background is detected as a background color and the background color information is reduced. In other words, the black background is converted into a color that is approximate to white. As a result, image data that a user cannot easily recognize is produced. As exemplary described above, the image processing apparatus disclosed in JP-A-2005-260530 has a problem in that the image data that a user cannot easily recognize is produced.

SUMMARY

Accordingly, aspects of the present invention provide an image processing apparatus, an image processing method and an image scanning apparatus capable of converting a background color of data to produce image data that is easily viewable.

According to an aspect of the present invention, there is provided an image processing apparatus including a background color acquiring unit, an area acquiring unit, a determining unit and a converting unit. The background color acquiring unit acquires a background color based on color data of pixels included in image data. The area acquiring unit acquires a background color area including a pixel having color data of the background color, based on the image data. The determining unit determines whether the background color area acquired by the area acquiring unit is adjacent to a non-background color area outside of the background color area, the non-background color area including a pixel having color data of a first color that is preset so that the color data of the pixel in the background color area can be converted thereto. The converting unit converts the color data of the pixel in the background color area into the first color when the determining unit determines that the background color area is not adjacent to the non-background color area which includes the pixel having the color data of the first color, and converts the color data of the pixel in the background color area into a second color which is different from the first color when the determining unit determines that the background color area is adjacent to the non-background color area which includes the pixel having the color data of the first color.

According to another aspect of the present invention, there is provided an image processing method including: acquiring a background color based on color data of pixels included in image data; acquiring a background color area including a pixel having color data of the background color based on the image data; determining whether the background color area is adjacent to a non-background color area outside of the background color area, the non-background color area including a pixel having color data of a first color that is preset so that the color data of the pixel in the background color area can be converted thereto; and converting the color data of the pixel in the background color area into the first color when it is determined that the background color area is not adjacent to the non-background color area which includes the pixel having color data of the first color, and converting the color data of the pixel in the background color area into a second color which is different from the first color when it is determined that the background color area is adjacent to the non-background color area which includes the pixel having color data of the first color.

According to another aspect of the present invention, there is provided an image processing apparatus including an acquiring unit, a first determining unit, a second determining unit, a third determining unit, a counting unit, a fourth determining unit and a converting unit. The acquiring unit acquires a background color based on color data of pixels included in image data. The first determining unit determines, for each pixel included in the image data, whether the pixel belongs to a first set of pixels or a second set of pixels, the color data of each pixel belonging to the first set of pixels is the background color acquired by the acquiring unit, the color data of each pixel belonging to the second set of pixels is not the background color acquired by the acquiring unit, and the second set of pixels including at least one pixel of color data of a first color. The second determining unit determines, for each pixel belonging to the first set of pixels, whether the pixel is adjacent to a pixel belonging to the second set of pixels. The third determining unit determines whether a color data of the pixel belonging to the second set of pixels, which is determined by the second determining unit to be adjacent to the pixel belonging to the first set of pixels, is approximate to the first color. The counting unit counts a number of pixels belonging to the first set of pixels that is adjacent to the pixel belonging to the second set of pixels which is determined by the third detecting unit that the color data thereof is approximate to the first color. The fourth determining unit determines whether the number of pixels counted by the counting unit is equal to or larger than a threshold value. The converting unit converts the color data of each pixel belonging to the first set of pixels into the first color when the fourth determining unit determines that the number of pixels counted by the counting unit is smaller than the threshold value, and converts the color data of each pixel belonging to the first set of pixels into a second color which is different from the first color when the fourth determining unit determines that the number of pixels counted by the counting unit is equal to or larger than the threshold value.

DETAILED DESCRIPTION

Hereinafter, illustrative embodiments implementing an image processing apparatus, an image processing method and an image scanning apparatus of the invention will be specifically described with reference to the drawings.

First, a schematic configuration of an image scanning apparatus 1 according to an illustrative embodiment is described with reference to FIGS. 1 to 3.

Figure 1:
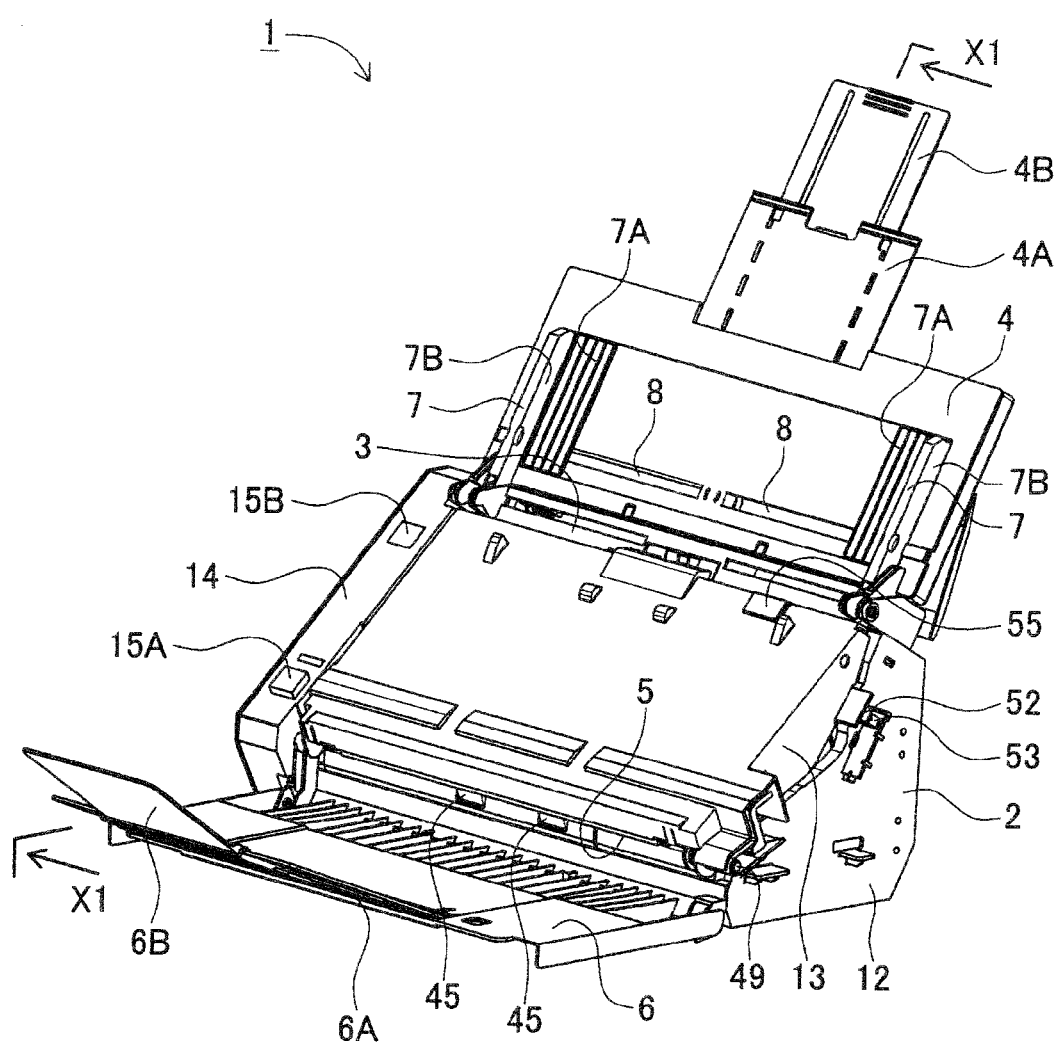
FIG. 1 is a perspective view showing an image scanning apparatus according to an illustrative embodiment of the invention.
Figure 2:
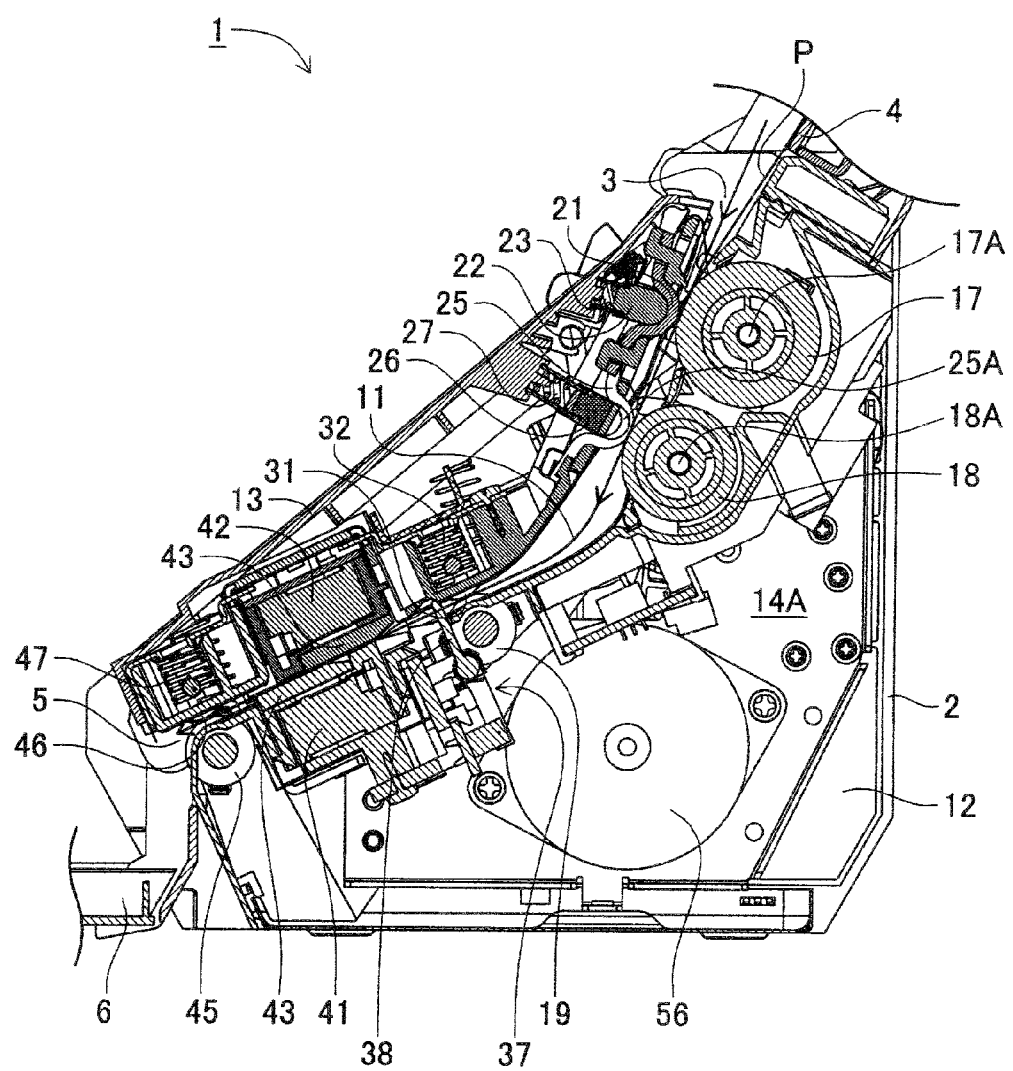
FIG. 2 is an overall sectional view, which is seen from an arrow direction of X1-X1 of FIG. 1.

As shown in FIGS. 1 and 2, the image scanning apparatus 1 has an apparatus body 2, a feeder port 3 that is provided at an upper part of the apparatus body 2, a feeder tray 4 that is disposed to be inclined at a substantially vertical angle above the feeder port 3, a discharge port 5 that is provided at a lower part of a front side of the apparatus body 2 and a discharge tray 6 on which a sheet P discharged from the discharge port 5 is stacked and that is arranged substantially horizontally.

The feeder tray 4 is provided with a pair of sheet guides 7 that restrains a position of the set sheet P in a width direction. Each sheet guide 7 has a cross-sectional shape of a substantial L shape and includes a plate 7A that can be slid while being supported by a pair of guide recesses 8 extending in a width direction of the feeder tray 4 and a sidewall 7B that stands from a side edge part of the plate 7A. In addition, the respective sheet guides 7 are configured so that when one sheet guide 7 is slid, the other sheet guide 7 is correspondingly slid in an opposite direction by an interlocking mechanism which is not shown.

In addition, auxiliary trays 4A, 4B, which are configured to be pulled out and stored in an upper and lower direction, are provided to an upper end portion of the feeder tray 4. The discharge tray 6 is provided to be rotatable toward the apparatus body 2 about a base end of the apparatus body 2 and thus to be able to closely contact an upper surface of the apparatus body 2. Also, the discharge tray 6 has auxiliary trays 6A, 6B at a side edge part thereof opposite to the apparatus body 2. As shown in FIG. 3, the respective auxiliary trays 6A, 6B are configured to be rotatable inwards to thus be stored so as to overlap the discharge tray 6.

The apparatus body 2 has a lower frame 12 that configures a conveyance path 11 from the feeder port 3 to the discharge port 5 of the sheet P and an upper frame 13 that covers an upper side of the lower frame 12 so as to be openable and closable. When seen from a front side of the lower frame 12, a left edge part is provided with a gear receiving unit 14 in which a gear train, which is not shown, is stored. A start switch 15A, an error lamp 15B and the like are arranged on an upper surface of the gear receiving unit 14.

Figure 3:
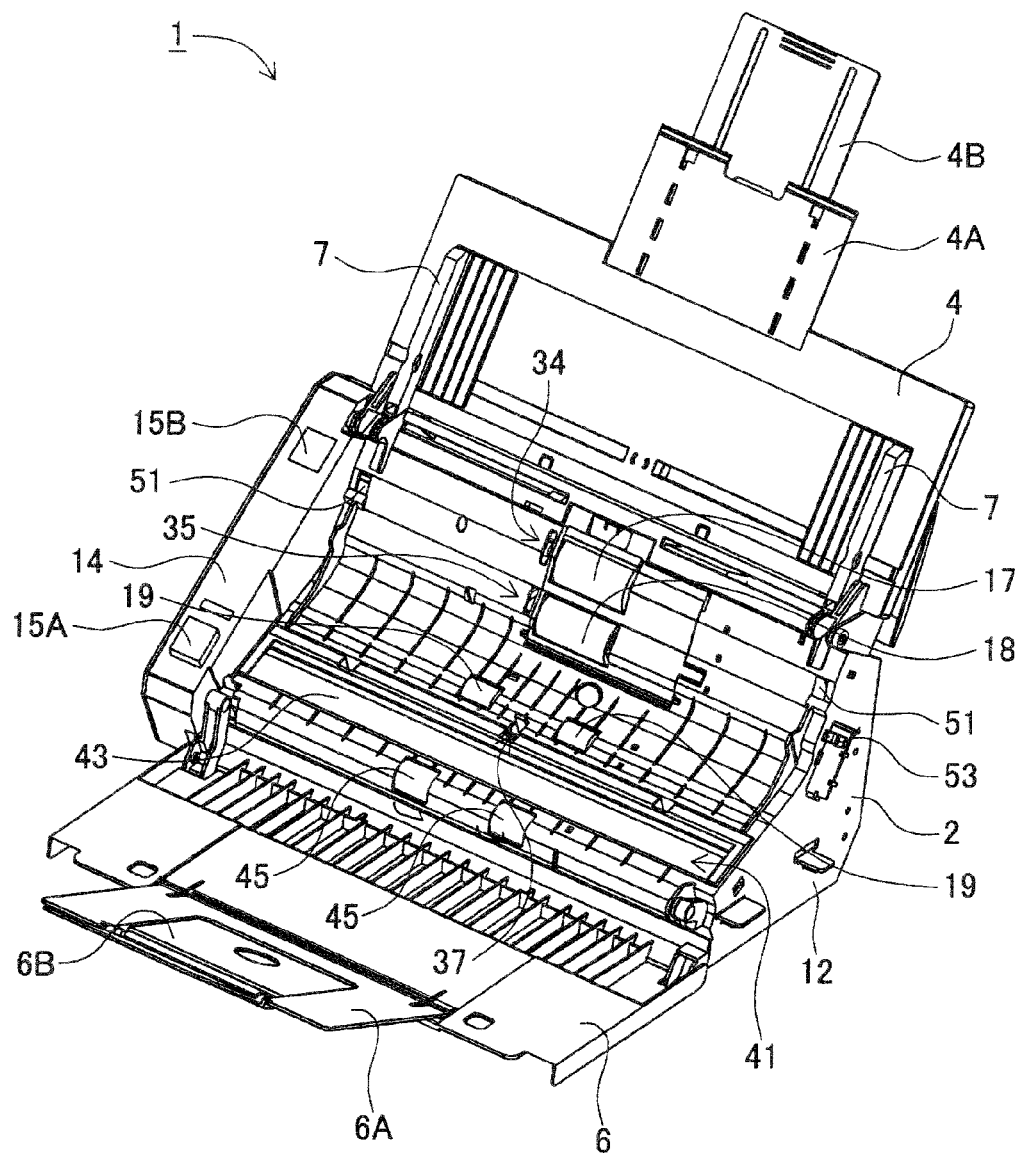
FIG. 3 is a perspective view showing a state in which an upper frame is removed.

As shown in FIGS. 2 and 3, the lower frame 12 is provided with a first conveyance roller 17 that is disposed adjacent to the feeder port 3 and separates and pulls the sheet P, which is set on the feeder tray 4, along the conveyance path 11. A second conveyance roller 18 that separates and pulls the sheet P along the conveyance path 11 is disposed downstream of the first conveyance roller 17 in a conveyance direction. A pair of third conveyance rollers 19 that is attached on a same shaft and conveys the sheet P along the conveyance path 11 is provided downstream of the second conveyance roller 18 in the conveyance direction.

A first separation member 21, which is made of a high frictional elastic member such as rubber and is brought into contact with an outer circumference of the first conveyance roller 17 when closing the upper frame, is provided at a position of the upper frame 13 opposing the first conveyance roller 17. When closing the upper frame 13, the first separation member 21 is elastically pressed by a pushing member 22 and a compression spring 23 which are arranged on a backside of the upper frame 13, so that it is pressed on the outer circumference of the first conveyance roller 17 with predetermined load.

In addition, a second separation member 25, which is made of a high frictional elastic member such as rubber and is brought into contact with an outer circumference of the second conveyance roller 18 when closing the upper frame, is provided at a position of the upper frame 13 opposing the second conveyance roller 18.

When closing the upper frame 13, the second separation member 25 is elastically pressed by a pushing member 26, which has a leading end portion having a rectangular cross section, and a compression spring 27 which are arranged on a backside of the upper frame 13 so that the second separation member 25 is pressed on the outer circumference of both axial ends of the second conveyance roller 18 with predetermined load.

In addition, a pair of pinch rollers 31 is rotatably provided at positions of the upper frame 13 opposing the pair of third conveyance rollers 19. The pinch rollers 31 have shafts that are elastically pressed toward the third conveyance rollers 19 by compression springs 32. Accordingly, the respective pinch rollers 31 are pressure-contacted to the outer circumferences of the third conveyance rollers 19, and when the third conveyance rollers 19 are respectively rotated, the respective pinch rollers 31 are correspondingly rotated.

Regarding the sheets P that are fed to the feeder tray 4 and guided to a nip portion between the first conveyance roller 17 and the first separation member 21, the lowest sheet P, i.e., the sheet P contacting the outer circumference of the first conveyance roller 17 is separated due to the friction with the first separation member 21 by the rotation of a shaft 17A of the first conveyance roller 17 and is then conveyed to the second conveyance roller 18.

Subsequently, regarding the sheet P conveyed to a nip portion between the second conveyance roller 18 and each contact part 25A of the second separation member 25, the sheet P contacting the outer circumference of the second conveyance roller 18 is separated by the friction with each contact part 25A and is then conveyed to the pair of third conveyance rollers 19 disposed downstream in the conveyance direction.

As shown in FIG. 3, a first sheet sensor 34 detecting the sheet P is provided at a position adjacent to a left side of the first conveyance roller 17 when seen from the front side. A second sheet sensor 35 detecting the sheet P is provided at a position adjacent to a left side of the second conveyance roller 18 when seen from the front side. When the first sheet sensor 34 detects the sheet P conveyed to the nip portion between the first conveyance roller 17 and the first separation member 21, the first sheet sensor outputs an ON signal. When the sheet P is not detected, the first sheet sensor outputs an OFF signal. Likewise, when the second sheet sensor 35 detects the sheet P conveyed to the nip portion between the second conveyance roller 18 and each contact part 25A of the second separation member 25, the second sheet sensor outputs an ON signal, and when the sheet P is not detected, the second sheet sensor outputs an OFF signal.

In addition, as shown in FIG. 3, a third sheet sensor 37 that detects a leading end portion of the sheet P having passed through the nip portions between the respective third conveyance rollers 19 and the respective pinch rollers 31 is provided at a substantially central position between the third conveyance rollers 19. As shown in FIG. 2, when a contact member 38 is rotated in a downstream direction in the conveyance direction by the sheet P having passed through the nip portions between the pair of third conveyance rollers 19 and the pair of pinch rollers 31, the third sheet sensor 37 outputs an ON signal. When the contact member 38 is not rotated by the sheet P, the third sheet sensor outputs an OFF signal.

As shown in FIGS. 2 and 3, the lower frame 12 is provided with a lower line sensor 41, which is configured by a so-called contact image sensor, at a downstream side of the third conveyance rollers 19 and the third sheet sensor 37 in the conveyance direction. The lower line sensor scans an image of a surface of the sheet P conveyed along the conveyance path 11.

In addition, the upper frame 13 is provided with an upper line sensor 42, which is configured by a contact image sensor, at a downstream side of the pinch rollers 31 in the conveyance direction so as to oppose to the lower line sensor 41. The upper line sensor scans an image of a backside of the sheet P conveyed along the conveyance path P.

The lower line sensor 41 and the upper line sensor 42 have the substantially same configuration. Each of the lower line sensor 41 and the upper line sensor 42 has a light source, a lens and a light receiving element, respectively. Also, each of the lower line sensor 41 and the upper line sensor 42 are provided with contact glasses 43, respectively, so as to oppose to the sheet P. The sheet P passes between the contact glasses 43 of the lower line sensor 41 and the upper line sensor 42 while closely contacting the contact glasses 43.

The respective line sensors 41, 42 illuminate lights from the light sources to the sheet P through the contact glasses 43, collect the lights reflected from the sheet P into the light receiving elements by the lenses, convert the lights into RGB signals corresponding to color data of an image and output the same. By performing image processing to the RGB signals, it is possible to obtain image data of both sides of the sheet P, which consists of RGB values of each pixel and the like, in a page unit.

The light receiving elements are arranged in a main scanning direction of the sheet P, which is a direction perpendicular to the conveyance path 11, in a chip unit, for example. In addition, the light sources and the lenses are arranged in the same direction as the light receiving elements. In addition, the respective contact glasses 43 extend in the main scanning direction in correspondence to a length of the main scanning direction of the lower line sensor 41 and the upper line sensor 42.

As shown in FIGS. 2 and 3, the lower frame 12 is provided with a pair of discharge rollers 45 at positions downstream from the conveyance direction of the lower line sensor 41, which are attached on a same shaft and discharge the sheet P from the discharge port 5 along the conveyance path 11. Also, the upper frame 13 is provided with a pair of pinch rollers 46 at positions opposed to the pair of discharge rollers 45.

The pinch rollers 46 have shafts that are elastically pressed toward the opposing discharge rollers 45 by compressing springs 47. Accordingly, the respective pinch rollers 46 are pressure-contacted on outer circumferences of the respective discharge rollers 45, so that when the respective discharge rollers 45 are rotated, the respective pinch rollers 46 are correspondingly rotated.

Here, as shown in FIGS. 1 to 3, the upper frame 13 is pivotably supported at both end portions of the discharge port 5 by a pair of shafts 49 protruding from both end portions of the side edge parts of the respective pinch rollers 46. By rotating the upper frame 13 to the lower frame 12 side and bringing the upper frame 13 into contact with the lower frame 12, elastic engaging pieces not shown, which are provided at both end portions of the side edge parts of the feeder port 3 of the upper frame 13, engages with respective engaging holes 51 provided at both side edge parts of the feeder port 3 of the lower frame 12.

When the upper frame 13 engages with the lower frame 12, a thin plate-shaped protruding piece 52, which protrudes from a right edge when seen from the front of the feeder port 3 of the upper frame 13, is received in a recess of a cover switch 53 configured by a recess-shaped photo micro sensor that is disposed at a right edge when seen from the front of the lower frame 12. Thereby, when the upper frame 13 engages with the lower frame 12 and the protruding piece 52 is thus received in the recess, the cover switch 53 outputs an ON signal. On the other hand, when the upper frame 13 is open, the cover switch outputs an OFF signal.

In addition, when an opening button 55 disposed on an inner side of the feeder port 3 of the upper frame 13 is pulled forward, the respective elastic engagement pieces, which are not shown, are rotated upward, so that the engagement pieces are disengaged from the respective engagement holes 51. Accordingly, when the sheet P is jammed on the conveyance path 11, or when each contact glass 43 is dirty, a user can easily solve the jamming problem or clean the respective contact glasses 43 by pulling the opening button 55 forward to open the upper frame 13 in the front direction.

Further, as shown in FIG. 2, a motor gear is attached to a motor shaft of a sheet conveyance motor 56, which is attached on a sidewall 14A of the gear receiving unit 14 and is configured to transfer the rotation driving to the first conveyance roller 17, the second conveyance roller 18, the third conveyance rollers 19 and the discharge rollers 45 through the gear train, which is not shown, received in the gear receiving unit 14.

Figure 4:
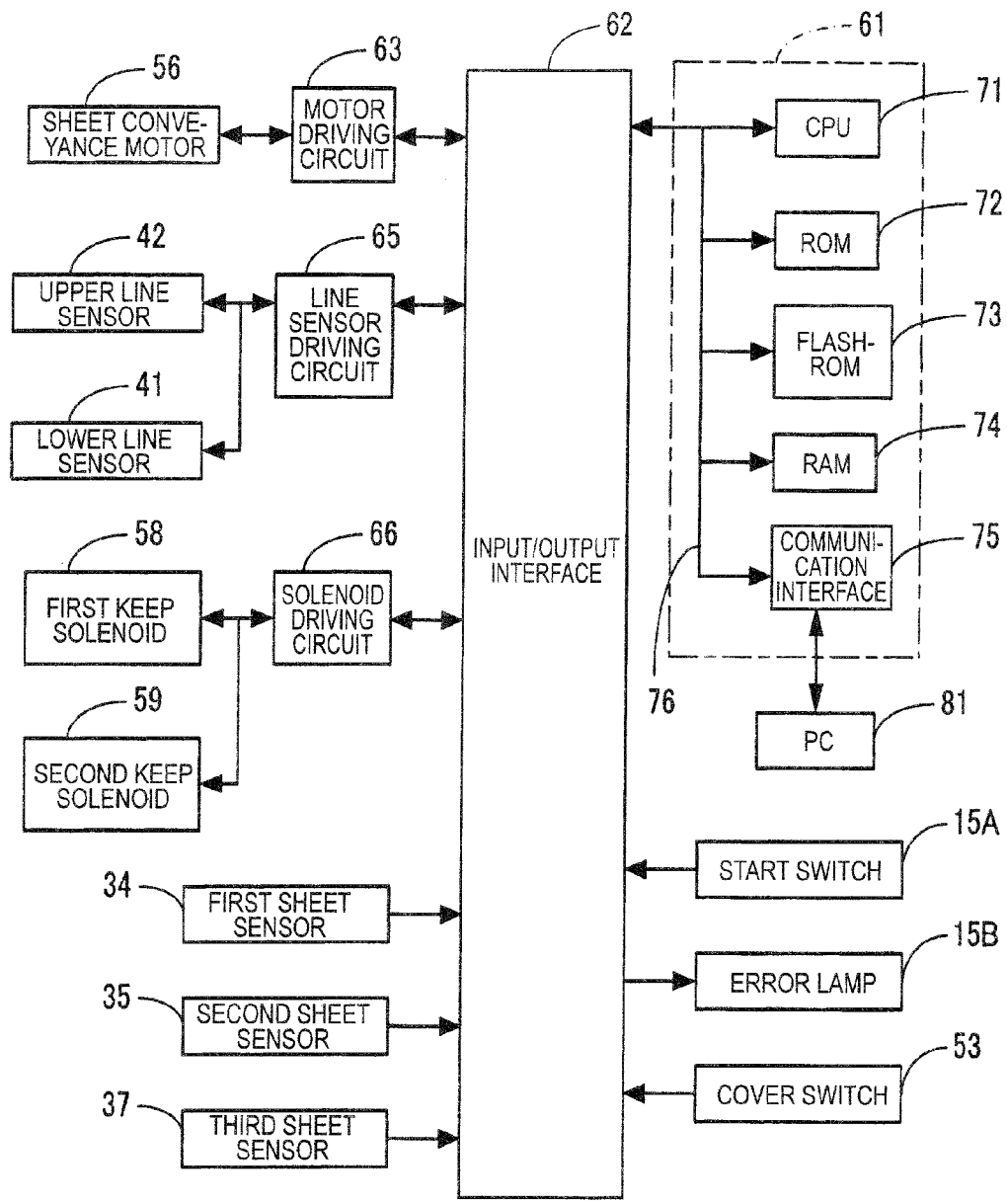
FIG. 4 is a circuit block diagram showing a circuit configuration of the image scanning apparatus.

As shown in FIG. 4, by driving a plunger of a first keep solenoid 58 received in the gear receiving unit 14 to a position at which it protrudes, the shaft 17A of the first conveyance roller 17 is rotated. Further, by driving the plunger of the first keep solenoid 58 to a position at which it is pulled, the rotating of the shaft 17A of the first conveyance roller 17 is stopped.

In addition, as shown in FIG. 4, by driving a plunger of a second keep solenoid 59 received in the gear receiving unit 14 to a position at which it protrudes, the shaft 18A of the second conveyance roller 18 is rotated. Further, by driving the plunger of the second keep solenoid 59 to a position at which it is pulled, the rotating of the shaft 18A of the second conveyance roller 18 is stopped.

Hereinafter, a circuit configuration of the image scanning apparatus 1 is described with reference to FIG. 4.

As shown in FIG. 4, the image scanning apparatus 1 has a control circuit unit 61 that controls the whole image scanning apparatus 1, an input-output interface 62 that is connected to the control circuit unit 61, and a motor driving circuit 63, a line sensor driving circuit 65, a solenoid driving circuit 66 and the like, which are connected to the input-output interface 62. In addition, the start switch 15A, the error lamp 15B, the first sheet sensor 34, the second sheet sensor 35, the third sheet sensor 37, the cover switch 53 and the like are connected to the input-output interface 62.

The control circuit unit 61 has a Central Processing Unit (CPU) 71, which is a calculation and control device for controlling the whole image scanning apparatus 1, a Read-Only Memory (ROM) 72, a flash ROM 73, a Random Access Memory (RAM) 74, a communication interface 75 and the like. In addition, the CPU 71, the ROM 72, the flash ROM 73, the RAM 74 and the communication interface 75 are connected to each other by a bus line 76 and transmit and receive data mutually.

The ROM 72 stores various parameters and programs necessary for controlling the image scanning apparatus 1. For example, the ROM 72 stores a variety of programs for a conveyance control process of conveying the sheet P. The flash ROM 73 stores a control program for preparing and outputting image data of images on the sheet P scanned by the lower line sensor 41 and the upper line sensor 42, and a variety of parameters.

Figure 5:
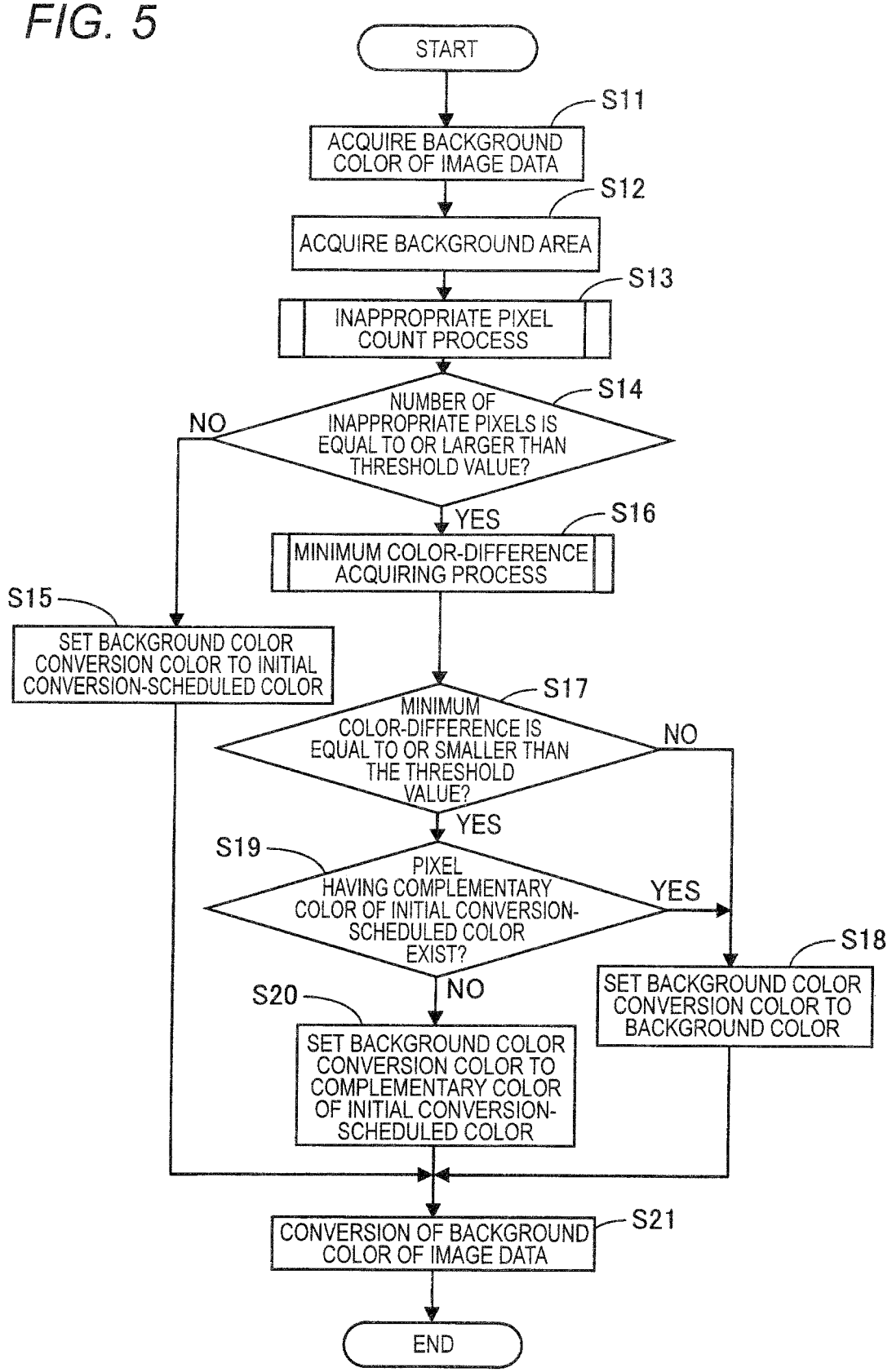
FIG. 5 is a flowchart showing a background color converting process of converting a background color of image data.

The flash ROM 73 stores various programs for a background color converting process, which is shown, for example, in FIG. 5, of converting a background color of image data acquired in a page unit and a variety of parameters such as RGB values of an initial conversion-scheduled color, RGB values of a complementary color of an initial conversion-scheduled color, threshold value ratios, color-difference threshold values, and the like.

The CPU 71 performs various calculations and controls based on the parameters and programs stored in the ROM 72 and the flash ROM 73. The RAM 74 temporarily stores the various calculation results calculated by the CPU 71, the image data on the sheet P scanned by the lower line sensor 41 and the upper line sensor 42, and the like.

The sheet conveyance motor 56 is connected to the motor driving circuit 63. The motor driving circuit 63 drives the sheet conveyance motor 56 in response to an instruction from the CPU 71 of the control circuit unit 61. Also, the upper line sensor 42 and the lower line sensor 41 are connected to the line sensor driving circuit 65.

The line sensor driving circuit 65 performs a driving control such as adjustment of operating current for turning on the light sources of the upper line sensor 42 and the lower line sensor 41, converts the electric signals of the light receiving elements into the RGB signals and the like and outputs the same, in response to an instruction from the CPU 71 of the control circuit unit 61. In addition, the CPU 71 temporarily stores the image data, which is prepared on the basis of the RGB signals and the like received from the line sensor driving circuit 65, in the RAM 74 and outputs the same to an external PC 81 through the communication interface 75. In this illustrative embodiment, the RGB signals are converted into digital signals of 0 to 255, which is expressed by a binary number of 8 bits. White is expressed by 255 and black is expressed by 0.

The first keep solenoid 58 and the second keep solenoid 59 are connected to the solenoid driving circuit 66. The solenoid driving circuit 66 performs the driving control so that the respective plungers of the first keep solenoid 58 and the second keep solenoid 59 are located at the protruding or pulled-in positions, in response to an instruction from the CPU 71 of the control circuit unit 61. The CPU 71 of the control circuit unit 61 controls the driving of the respective keep solenoids 58, 59 through the solenoid driving circuit 66, based on the detection signals from the first sheet sensor 34, the second sheet sensor 35 and the third sheet sensor 37.

[Background Color Converting Process]

Figure 6:
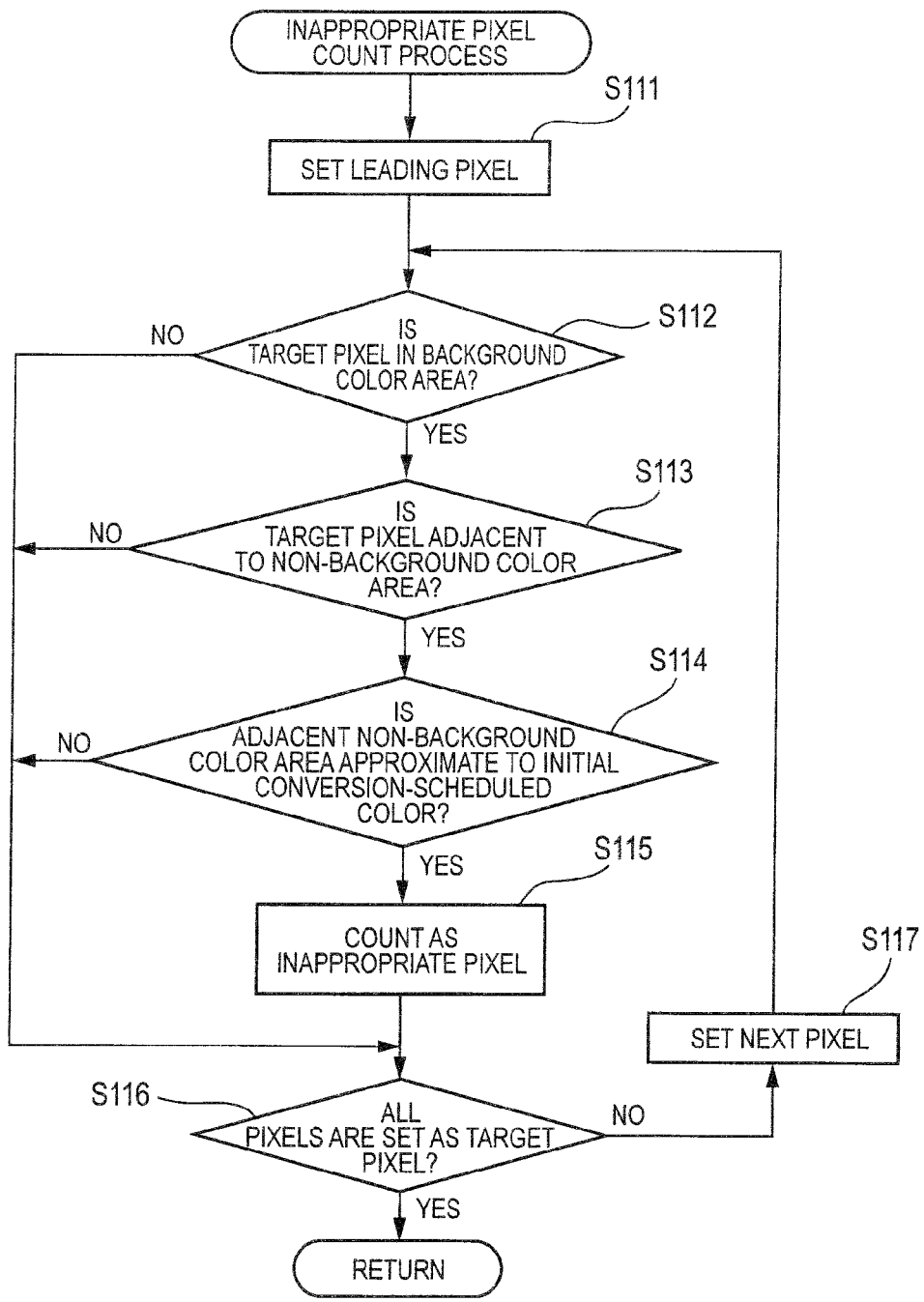
FIG. 6 is a flowchart showing a sub-process of an inappropriate pixel count process of FIG. 5.
Figure 7:
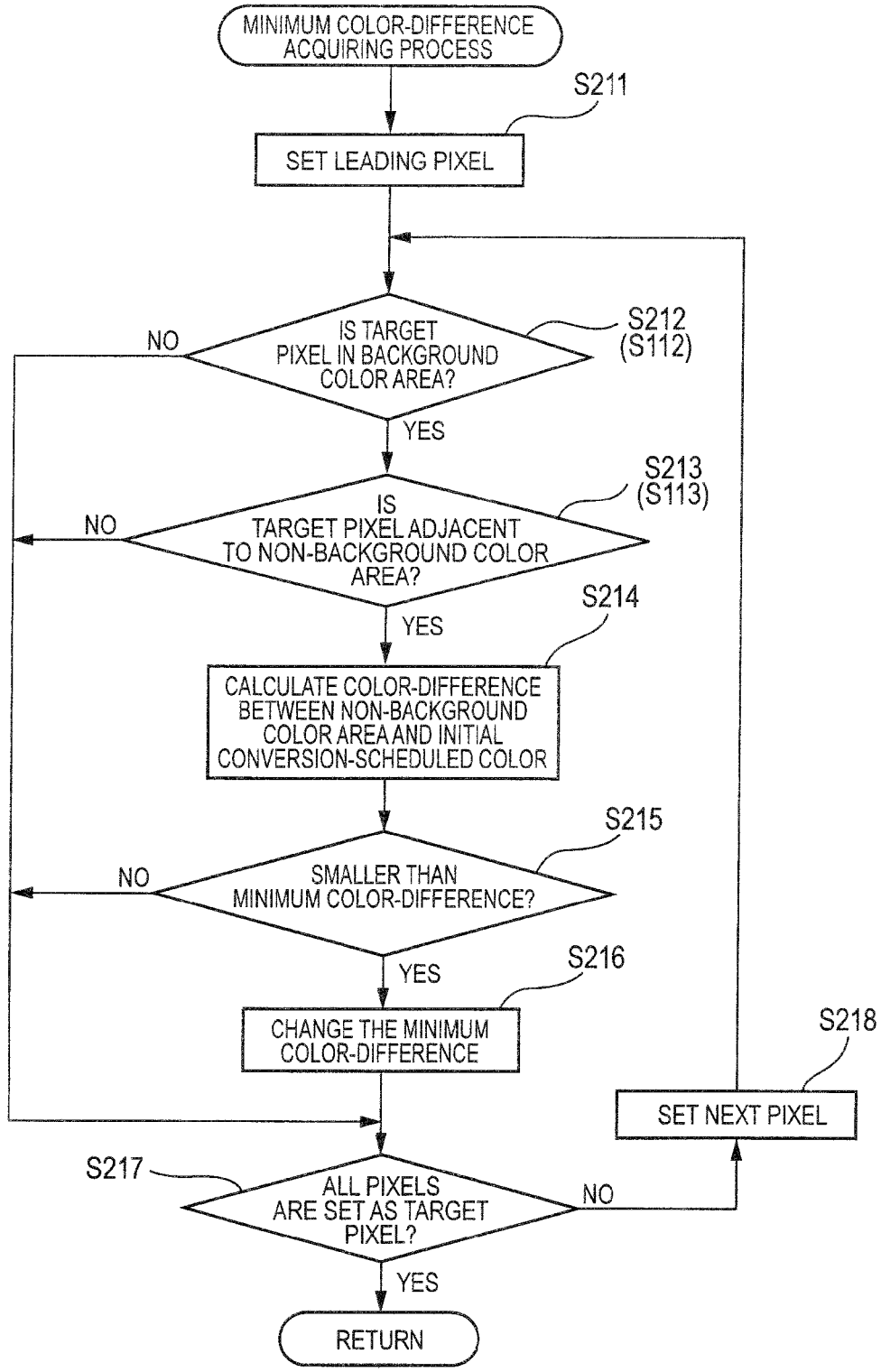
FIG. 7 is a flowchart showing a sub-process of a minimum color-difference acquiring process of FIG. 5.

Hereinafter, a background color converting process of converting a background color of image data, which is acquired in a page unit, by the image scanning apparatus 1 configured as described above will be described with reference to FIGS. 5 to 11. The program that is shown with flowcharts of FIGS. 5 to 7 is stored in the flash ROM 73 and is executed by the CPU 71. In addition, the image data of the sheet P, which is obtained by the lower line sensor 41 and the upper line sensor 42, is stored in a page unit in the RAM 74. The CPU 71 executes the background color converting process for the image data of each page unit.

As shown in FIG. 5, in a step (hereinafter, abbreviated to S) 11, the CPU 71 extracts the image data of a page, which is stored in the RAM 74, into a working area of the RAM 74. Then, the CPU 71 reads out RGB values from a leading pixel of a first line of the image data extracted into the working area to a final pixel of a second line or third line. The CPU 71 calculates average values of the RGB values of the pixels and stores the calculated average values in the RAM 74, as RGB values of a background color of the image data.

In S12, the CPU 71 reads out the RGB values of the background color from the RAM 74 and acquires a background color area including a pixel having the RGB values of the background color among the respective pixels of the image data. Specifically, the CPU 71 sequentially allots numbers N (N=1, 2, 3, . . . ) from a leading pixel of a first line of the image data to a final pixel of a final line. The CPU 71 sequentially stores the numbers N allotted to the pixels having the RGB values of a background color in the RAM 74, as numbers of pixels in a background color area. Meanwhile, when all differences between each value of R, G and B of a pixel and each value of R, G and B of the background color calculated in S11 are within a range of −3 to +3, the CPU 71 determines that the RGB values of the pixel are the RGB values of a background color.

Subsequently, in S13, the CPU 71 executes a sub-process of an inappropriate pixel count process. The sub-process of the inappropriate pixel count process is described in FIG. 6. In the sub-process of the inappropriate pixel count process, the CPU 71 counts an inappropriate pixel of the pixels in the background area, which is adjacent to a pixel in a non-background area having RGB values approximate to an initial conversion-scheduled color that is preset for background color conversion.

Figure 8:
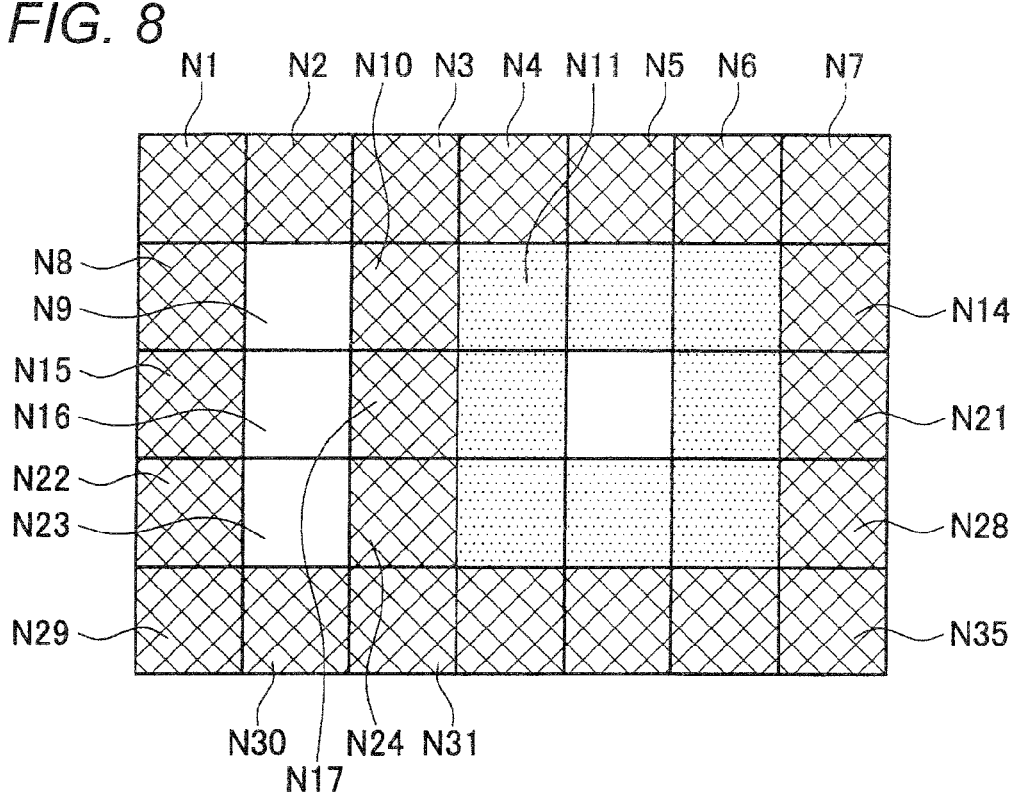
FIG. 8 illustrates inappropriate pixel count.

Here, the sub-process of an inappropriate pixel count process is described with reference to FIGS. 6 and 8. In FIG. 8, pixels to which numbers N1, N2, . . . , N8, N10, N14, N15, N17, N21, N22, N24, N28, . . . , N35 are respectively allotted indicate pixels of a background color (for example, blue) in the background color area. Pixels to which numbers N9, N16, N19 and N23 are respectively allotted indicate pixels of white in a non-background color area. Also, pixels to which numbers N11, N12, N13, N18, N20, N25, N26 and N27 are respectively allotted indicate pixels of yellowish green in the non-background color area.

As shown in FIG. 6, in S111, the CPU 71 sets the leading pixel of the first line as a target pixel for which the CPU determines whether the corresponding pixel is an inappropriate pixel. In other words, the CPU sets the number N to 1 and thus regards the leading pixel as a target pixel. In addition, the CPU 71 initializes an inappropriate pixel counter that counts inappropriate pixels. It is inappropriate to convert the color of the inappropriate pixels into the initial conversion-scheduled color, because if the color of the inappropriate pixel is converted into the initial conversion-scheduled color, a user cannot easily recognize the image data.

Subsequently, in S112, the CPU 71 reads out the number N of the target pixel from the RAM 74. The CPU 71 determines whether the number belongs to the numbers of pixels in a background color area stored in the RAM 74, i.e., whether the target pixel is a pixel in the background color area. When it is determined that the number N of the target pixel is not present in the numbers of pixels in a background color area, i.e., when it is determined that the target pixel is a pixel in the non-background color area outside of the background color area (S112: NO), the CPU 71 proceeds to S116.

On the other hand, when it is determined that the number N of the target pixel is present in the numbers of pixels in a background color area, i.e., when it is determined that the target pixel is a pixel in the background color area (S112: YES), the CPU 71 proceeds to S113. In S113, the CPU 71 determines whether the target pixel is adjacent to a pixel in the non-background color area outside of the background color area. When it is determined that the target pixel is not adjacent to a pixel in the non-background color area (S113: NO), the CPU 71 proceeds to S116.

For example, as shown in FIG. 8, when a pixel of the background color having the number N1 is set as the target pixel, pixels adjacent to the pixel having the number N1 are pixels of the background color having the numbers N2 and N8, i.e., only pixels in the background color area. Accordingly, the CPU 71 determines that the target pixel is not adjacent to a pixel in the non-background color area and proceeds to S116.

On the other hand, when it is determined that the target pixel is adjacent to a pixel in the non-background color area (S113: YES), the CPU 71 proceeds to S114. For example, as shown in FIG. 8, when a pixel of the background color having the number N2 is set as the target pixel, pixels adjacent to the pixel having the number N2 is pixels of the background color having the numbers N1 and N3 and a pixel having the number N9 in the non-background color area. Accordingly, the CPU 71 determines that the target pixel is adjacent to a pixel in the non-background color area and proceeds to S114.

In S114, the CPU 71 determines whether the RGB values of the pixel in the non-background color area adjacent to the target pixel are RGB values approximate to the initial conversion-scheduled color, i.e., whether the non-background color area to which the target pixel is adjacent is approximate to the initial conversion-scheduled color. Here, when all differences between each value of R, G and B of the pixel in the non-background color area and each value of R, G and B of the initial conversion-scheduled color are within a range of −5 to +5, the CPU 71 determines that the non-background color area, to which the target pixel is adjacent, is approximate to the initial conversion-scheduled color. For example, each value is expressed by 8 bits of 0 to 255, and when the initial conversion-scheduled color is white, R=255, G=255 and B=255.

When it is determined that the non-background color area, to which the target pixel is adjacent, is not approximate to the initial conversion-scheduled color (S114: NO), the CPU 71 proceeds to S116. For example, as shown in FIG. 8, when a pixel of the background color having the number N4 is set as the target pixel, the pixels adjacent to the number N4 are pixels of the background color having the numbers N3 and N5 and a pixel having the number N11 in the non-background color area.

When at least one of differences between the respective values of R, G and B of the pixel having the number N11 in the non-background color area and the respective values of R, G and B of the initial conversion-scheduled color is equal to or smaller than −6 or equal to or larger than +6, the CPU 71 determines that the non-background color area, to which the target pixel N4 is adjacent, is not approximate to the initial conversion-scheduled color and proceeds to S116.

On the other hand, when it is determined that the non-background color area, to which the target pixel is adjacent, is approximate to the initial conversion-scheduled color (S114: YES), the CPU 71 proceeds to S115. For example, as shown in FIG. 8, when a pixel of the background color having the number N2 is set as the target pixel, the pixels adjacent to the number N2 are adjacent to pixels of the background color having the numbers N1 and N3 and a pixel having the number N9 in the non-background color area. When all differences between the respective values of R, G and B of the pixel having the number N11 in the non-background color area and the respective values of R, G and B of the initial conversion-scheduled color are within the range of −5 to +5, the CPU 71 determines that the non-background color area, to which the target pixel N2 is adjacent, is approximate to the initial conversion-scheduled color and proceeds to S115.

In S115, the CPU 71 counts the target pixel as an inappropriate pixel, i.e., adds 1 to the inappropriate pixel counter, and proceeds to S116. In S116, the CPU 71 determines whether the number N of the target pixel is the number allotted to the final pixel of the final line, i.e., whether all the pixels of the image data has been set as the target pixel.

When it is determined that the number N of the target pixel is not the number allotted to the final pixel of the final line, i.e., that all pixels of the image data are not set as the target pixel (S116: NO), the CPU 71 proceeds to S117. In S117, the CPU 71 stores the number N allotted to a next pixel in the RAM 74, as the number N of the target pixel, i.e., sets a next pixel as a target pixel, and then re-executes the processes after S112.

On the other hand, when it is determined that the number N of the target pixel is the number allotted to the final pixel of the final line, i.e., that all pixels of the image data are set as the target pixel (S116: YES), the CPU 71 ends the above sub-process and returns to S14 of the main flowchart.

As shown in FIG. 5, in S14, the CPU 71 reads out a threshold value ratio, for example, threshold value ratio=3%, from the flash ROM 73. The CPU 71 stores a value, which is obtained by multiplying the total number of pixels of the image data by the threshold value ratio, in the RAM 74, as a threshold value of the number of inappropriate pixels, which is a change threshold value. Subsequently, the CPU 71 determines whether the count value of the inappropriate pixel counter stored in the RAM 74 is equal to or larger than the threshold value of the number of inappropriate pixels.

In the meantime, the threshold value of the number of inappropriate pixels, which is a change threshold value, may be stored beforehand in the flash ROM 73 for each sheet size (A3, A4, A5 and the like) of the sheet P. Then, in S14, the CPU 71 may read out the threshold value of the number of inappropriate pixels, which corresponds to the sheet size of the sheet P, from the flash ROM 73.

When the count value of the inappropriate pixel counter is below the threshold value of the number of inappropriate pixels (S14: NO), the CPU 71 proceeds to S15. In S15, the CPU 71 reads out the RGB values of the initial conversion-scheduled color from the flash ROM 73. For example, when the initial conversion-scheduled color is white, R=255, G=255 and B=255. The CPU 71 stores the read out RGB values in the RAM 74 as a background color conversion color for converting the background color, that is, the RGB values of the initial conversion-scheduled color is set as the background color conversion color, and then proceeds to S21.

On the other hand, when the count value of the inappropriate pixel counter is equal to or larger than the threshold value of the number of inappropriate pixels (S14: YES), the CPU 71 proceeds to S16. For example, as shown in FIG. 8, when all differences between the respective values of R, G and B of the pixels having the numbers N9, N16 and N23 in the non-background color area and the respective values of R, G and B of the initial conversion-scheduled color are within the range of −5 to +5, the CPU 71 counts the eight pixels having the numbers N2, N8, N10, N15, N17, N22, N24 and N30 in the background color area as the inappropriate pixel. In this case, the count value of the inappropriate pixel counter becomes eight 8.

In addition, when the CPU 71 reads out 10% from the flash ROM 73 as the threshold value ratio, the CPU sets, as the threshold value of the number of inappropriate pixels, 3.5 that is 10 percents of the total number of pixels of the image data, i.e., 35. Then, since the count value of the inappropriate pixel counter 8 is larger than the threshold value of the number of inappropriate pixels 3.5, the CPU 71 proceeds to S16.

In S16, the CPU 71 executes a sub-process, which is described in FIG. 7, of a minimum color-difference acquiring process. In the minimum color-difference acquiring process, the CPU 71 acquires a minimum color-difference of differences between RGB values of a pixel in the non-background color area adjacent to the inappropriate pixel and the RGB values of the initial conversion-scheduled color. Here, the color-difference is a summed value of the differences between the respective values of R, G and B of the target pixel and the respective values of R, G and B of the initial conversion-scheduled color.

Figure 9:
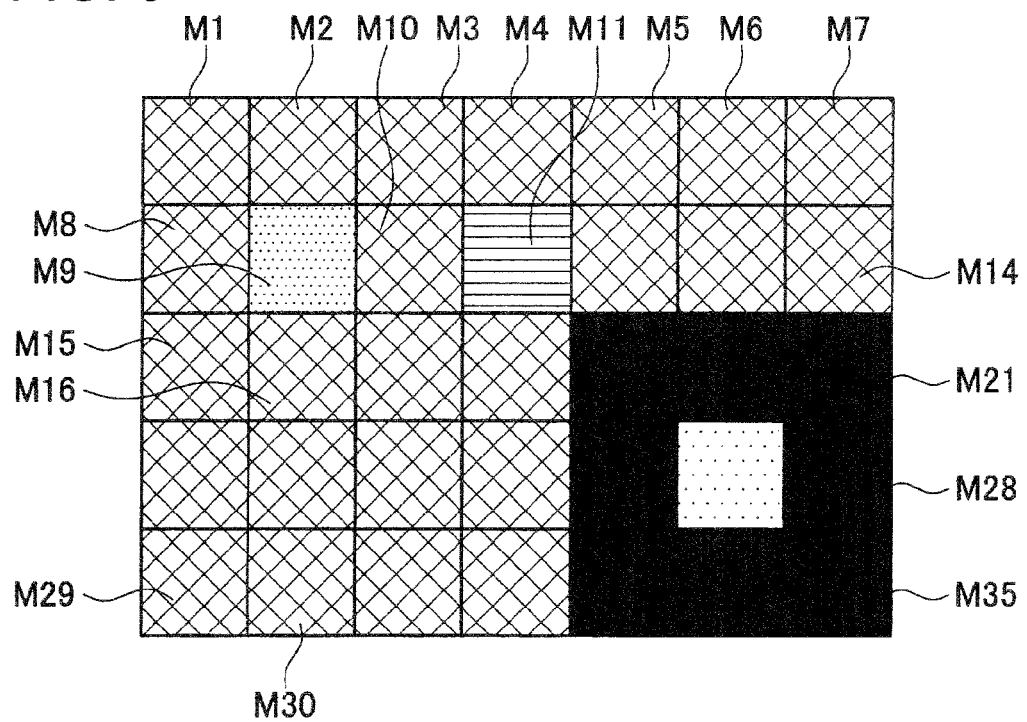
FIG. 9 illustrates calculation of color-difference.

Here, the sub-process of a minimum color-difference acquiring process is described with reference to FIGS. 7 and 9. In FIG. 9, pixels to which numbers M1, M2, . . . , M8, M10, M12, M13, . . . , M18, M22, . . . , M25, M29, . . . , M32 are respectively allotted indicate pixels of a background color, for example, blue, in the background color area. In addition, a pixel having the number M9 allotted thereto indicates a pixel of light blue (R=204, G=204, B=225) in the non-background color area.

Further, a pixel having the number M11 allotted thereto indicates a pixel of red (R=0, G=0, B=255) in the non-background color area. Pixels having the numbers M19, M20, M21, M26, M28, M33, M34 and M35 indicate pixels of black (R=0, G=0, B=0) in the non-background color area. A pixel having the number M27 allotted thereto indicates a pixel of light green (R=204, G=255, B=255) in the non-background color area.

As shown in FIG. 7, in S211, the CPU 71 sets the leading pixel of the first line as a target pixel for which a color-difference between the target pixel and the initial conversion-scheduled color, which is preset for background color conversion, is calculated. In other words, the CPU sets the number N to 1 and thus regards the leading pixel as a target pixel. In addition, the CPU 71 reads out a minimum color-difference from the RAM 74 and substitutes 765 for the minimum color-difference and again stores the minimum color-difference in the RAM 74. In the meantime, 765 indicates a maximum color-difference value between black (R=0, G=0, B=0) and white (R=255, G=255, B=255) and is a summed value of the respective differences 255 between the respective values of R, G and B.

Subsequently, in S212, the CPU executes the process of S112 and determines whether the target pixel is a pixel in the background color area. When it is determined that the target pixel is a pixel in the non-background color area outside of the background color area (S212: NO), the CPU 71 proceeds to S217.

On the other hand, when it is determined that the target pixel is a pixel in the background color area (S212: YES), the CPU 71 proceeds to S213. In S213, the CPU 71 executes the process of S113 and determines whether the target pixel is adjacent to a pixel in the non-background color area outside of the background color area. When it is determined that the target pixel is not adjacent to a pixel in the non-background color area (S213: NO), the CPU 71 proceeds to S217.

On the other hand, when it is determined that the target pixel is adjacent to a pixel in the non-background color area (S213: YES), the CPU 71 proceeds to S214. In S214, the CPU 71 stores the RGB values of the pixel in the non-background color area, to which the target pixel is adjacent, in the RAM 74. In addition, the CPU 71 calculates the color-difference by summing the differences between the respective values of R, G and B of the pixel in the non-background color area, to which the target pixel is adjacent, and the respective values of R, G and B of the initial conversion-scheduled color.

For example, as shown in FIG. 9, when a pixel of the background color having the number M2 is set as the target pixel, pixels adjacent to the number M2 are pixels having the numbers M1, M3 of the background color and a pixel having the number of M9 in the non-background color area. When the RGB values of the pixel having the number of M9 in the non-background color area are R=204, G=204 and B=255 and the RGB values of the initial conversion-scheduled color are R=255, G=255 and B=255, the color-difference is 102 (=51+51).

In addition, when a pixel having the number M4 of the background color is set as the target pixel, pixels adjacent to the number M4 are adjacent to pixels having the numbers M3, M5 of the background color and a pixel having the number of M11 in the non-background color area. When the RGB values of the pixel having the number of M11 in the non-background color area are R=0, G=0 and B=255 and the RGB values of the initial conversion-scheduled color are R=255, G=255 and B=255, the color-difference is 510 (=255+255).

Subsequently, in S215, the CPU 71 reads out the minimum color-difference from the RAM 74 and determines whether the value of the color-difference calculated in S214 is smaller than the minimum color-difference. When it is determined that the value of the color-difference calculated in S214 is equal to or larger than the minimum color-difference (S215: NO), the CPU 71 proceeds to S217.

On the other hand, when it is determined that the value of the color-difference calculated in S214 is smaller than the minimum color-difference (S215: YES), the CPU 71 proceeds to S216. In S216, the CPU 71 substitutes the value of the color-difference calculated in S214 with the minimum color-difference, again stores the minimum color-difference in the RAM 74 and proceeds to S217. In S217, the CPU 71 determines whether the number N of the target pixel is the number allotted to the final pixel of the final line, i.e., whether all pixels of the image data are set as the target pixel.

When it is determined that the number N of the target pixel is not the number allotted to the final pixel of the final line, i.e., that all pixels of the image data are not set as the target pixel (S217: NO), the CPU proceeds to S218. In S218, the CPU 71 stores the number N allotted to a next pixel in the RAM 74, as the number N of the target pixel. In other words, the CPU sets a next pixel as a target pixel for which a color-difference between the target pixel and the initial conversion-scheduled color, which is preset for background color conversion, is calculated.

On the other hand, when it is determined that the number N of the target pixel is the number allotted to the final pixel of the final line, i.e., that all pixels of the image data are set as the target pixel (S217: YES), the CPU ends the above sub-process and returns to S17 of the main flowchart.

As shown in FIG. 5, in S17, the CPU 71 reads out the color-difference threshold value, for example, color-difference threshold value=50, from the flash ROM 73. The CPU 71 determines whether the minimum color-difference stored in the RAM 74 is equal to or smaller than the color-difference threshold value. When it is determined that the minimum color-difference stored in the RAM 74 is larger than the color-difference threshold value (S217: NO), the CPU 71 proceeds to S18. In S18, the CPU 71 reads out the RGB values of the background color, which is acquired in S11, from the RAM 74. The CPU 71 stores the read out RGB values in the RAM 74 as the background color conversion color by which the background color is converted. In other words, the CPU 71 sets the background color conversion color with the RGB values (change conversion-scheduled color) of the background color of the sheet P. In other words, the CPU 71 sets the background color to be left as it is. Subsequently, the CPU 71 proceeds to S21.

Figure 10:
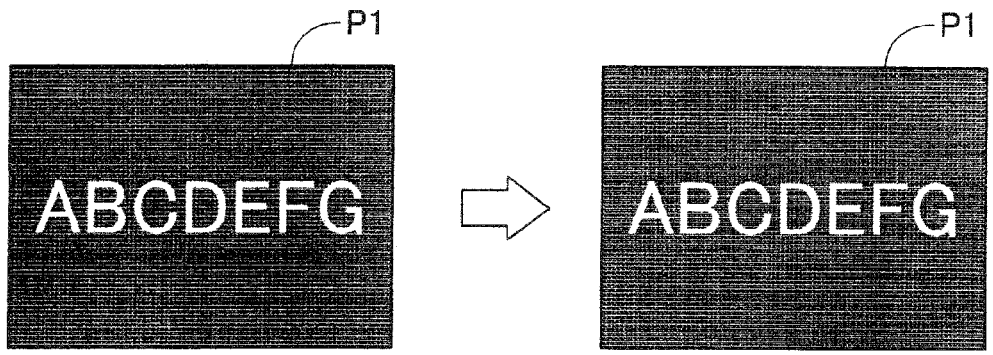
FIG. 10 is a view showing an example in which a background color is set as a background color conversion color.

For example, as shown in FIG. 10, the initial conversion-scheduled color is white (for example, R=255, G=255, B=255), the background color of the sheet P1 is blue and the letters ABCDEFG are light blue, i.e., R=204, G=204 and B=255, the color-difference is 102 (=51+51). When the color-difference threshold value is 50, the minimum color-difference (=102) is larger than the color-difference threshold value. Accordingly, the CPU sets the background color conversion color with the RGB values of the background color of the sheet P1, i.e., the RGB values of blue, without converting the background color conversion color into white, and proceeds to S21.

On the other hand, when it is determined that the minimum color-difference stored in the RAM 74 is equal to or smaller than the color-difference threshold value (S217: YES), the CPU 71 proceeds to S19. In S19, the CPU 71 reads out the RGB values of a complementary color of the initial conversion-scheduled color from the flash ROM 73. The CPU 71 determines whether the RGB values of a complementary color of the initial conversion-scheduled color is present in the RGB values of the pixels in the non-background color area to which the target pixel stored in the RAM 74 in S214 is adjacent.

When it is determined that the RGB values of a complementary color of the initial conversion-scheduled color is present in the RGB values of the pixels in the non-background color area to which the target pixel stored in the RAM 74 in S214 is adjacent (S19: YES), the CPU proceeds to S18.

On the other hand, when it is determined that the RGB values of a complementary color of the initial conversion-scheduled color is not present in the RGB values of the pixels in the non-background color area to which the target pixel stored in the RAM 74 in S214 is adjacent (S19: NO), the CPU proceeds to S20. In S20, the CPU 71 reads out the RGB values of the complementary color of the initial conversion-scheduled color from the flash ROM 73, stores the RGB values in the RAM 74, as a background color conversion color for which the background color is converted. In other words, the CPU 71 sets the background color conversion color with the RGB values of the complementary color of the initial conversion-scheduled color (change conversion-scheduled color), and then proceeds to S21.

Figure 11:
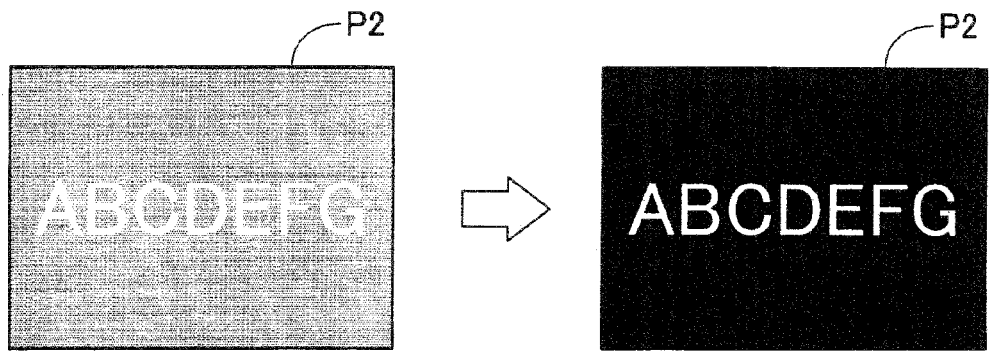
FIG. 11 is a view showing an example in which a complementary color of an initial conversion-scheduled color is set as a background color conversion color is.

For example, as shown in FIG. 11, when the initial conversion-scheduled color is white (for example, R=255, G=255, B=255), the background color of the sheet P2 is light yellow and the letters ABCDEFG are light blue, the CPU 71 sets the background color conversion color with the RGB values (for example, R=0, G=0, B=0) of black that is a complementary color of white and then proceeds to S21.

In S21, the CPU 71 reads out the RGB values of the background color conversion color from the RAM 74 and converts the RGB values of all pixels in the background area of the image data into the RGB values of the background color conversion color. Then, when there is image data of a next page, the CPU 71 re-executes the processes after S11, and when there is no image data of a next page, the CPU 71 ends the process.

As described above, in the image scanning apparatus 1 of this illustrative embodiment, the CPU 71 counts the inappropriate pixel, of the pixels in the background area, for which it is inappropriate to convert the background color into the initial conversion-scheduled color. When the count value of the inappropriate pixel is smaller than the threshold value of the number of inappropriate pixels, the CPU 71 converts the background color into the RGB values of the initial conversion-scheduled color. Thereby, when the color data of the pixel in the non-background color area adjacent to the background color area is not approximate to the preset initial conversion-scheduled color, the CPU 71 can produce an image data that is easily viewable by converting the background color of the image data into the initial conversion-scheduled color.

In addition, when the pixel in the non-background color area adjacent to the background color area is approximate to the preset initial conversion-scheduled color, the CPU 71 calculates the color-differences between the RGB values of the respective pixels in the non-background color area adjacent to the inappropriate pixels and the RGB values of the initial conversion-scheduled color, thereby acquiring a minimum color-difference. When the minimum color-difference is larger than the color-difference threshold value, the CPU 71 performs the conversion so that the background color of the image data is unchanged, thereby producing an image data that is easily viewable.

In addition, even when the minimum color-difference is equal to or smaller than the color-difference threshold value, when there is a pixel having the RGB values of the complementary color of the initial conversion-scheduled color among the pixels in the non-background color area adjacent to the background color area, the CPU 71 performs the conversion so that the background color of the image data unchanged, thereby producing an image data that is easily viewable. Also, regarding the case where the pixel in the non-background color area adjacent to the background color area is approximate to the preset initial conversion-scheduled color and the minimum color-difference is equal to or smaller than the color-difference threshold value, when the pixel having the RGB values of the complementary color of the initial conversion-scheduled color does not exist in the pixels in the non-background color area adjacent to the background color area, the CPU 71 converts the background color of the image data into the complementary color of the initial conversion-scheduled color, thereby producing an image data that is easily viewable.

Figure 12:
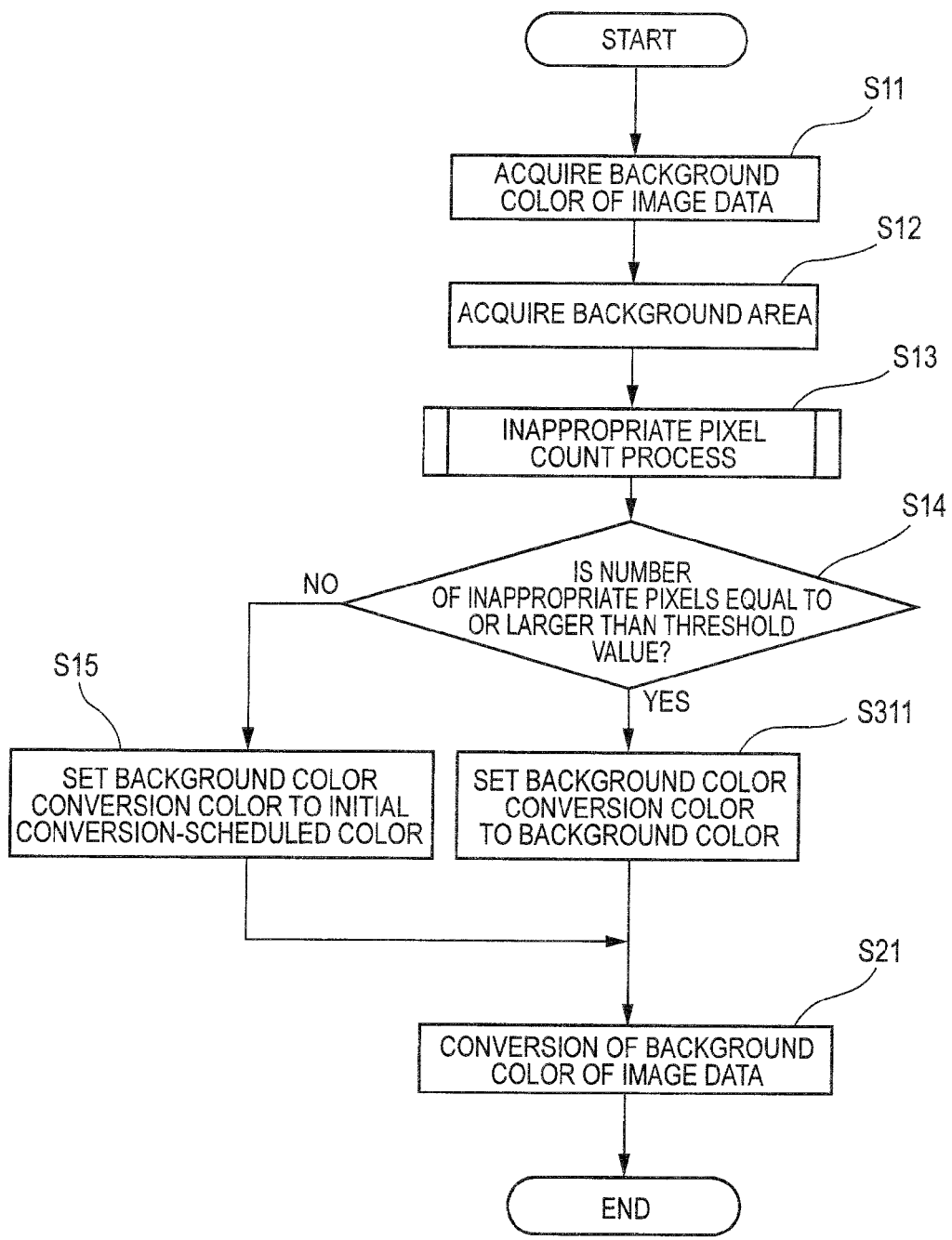
FIG. 12 is a flowchart showing a background color converting process of converting a background color of image data according to a first another illustrative embodiment.

The present invention is not limited to the above-described illustrative embodiment and can be variously modified and changed without departing from the scope of the invention. For example, the present invention can be modified and changed in the following way:

(A) For example, as shown in FIG. 12, a process S311 may be executed instead of S16 to S20 of the illustrative embodiment. In other words, when the count value of the inappropriate pixel counter is equal to or larger than the threshold value of the number of inappropriate pixels (S14: YES), the CPU 71 proceeds to S311. In S311, the CPU 71 may read out the RGB values of the background color, which is acquired in S11, from the RAM 74, store the read out RGB values in the RAM 74 as a background color conversion color by which the background color is converted, i.e., set the background color conversion color to the RGB values of the background color of the sheet P, i.e., set the background color to be unchanged, and then proceed to S21.

Thereby, when a pixel in the non-background color area adjacent to the background color area is approximate to the preset initial conversion-scheduled color, the CPU 71 performs the conversion so that the background color of the image data is unchanged, thereby producing an image data that is easily viewable.

Figure 13:
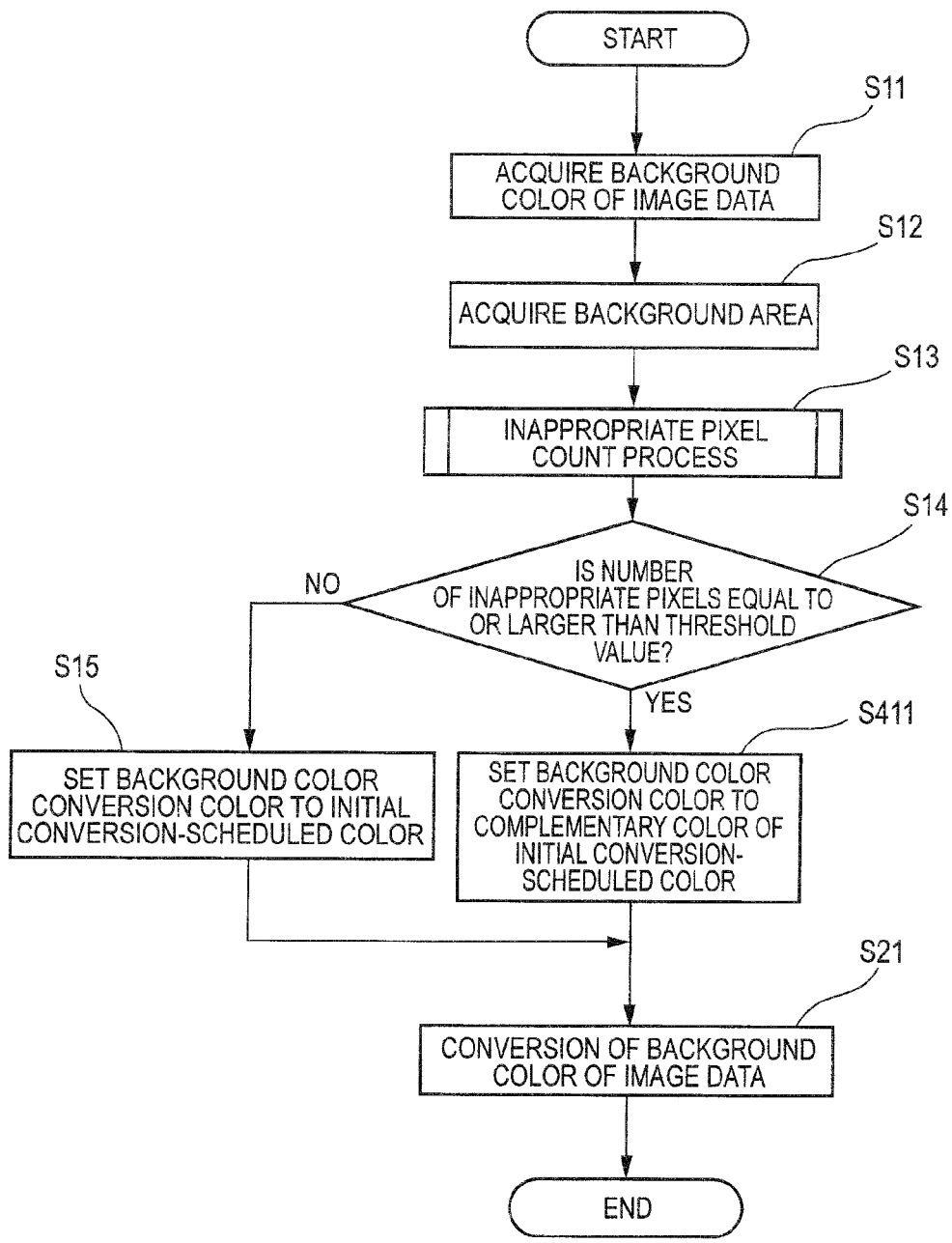
FIG. 13 is a flowchart showing a background color converting process of converting a background color of image data according to a second another illustrative embodiment.

(B) Further, for example, as shown in FIG. 13, a process S411 may be executed instead of S16 to S20 of the illustrative embodiment. In other words, when the count value of the inappropriate pixel counter is equal to or larger than the threshold value of the number of inappropriate pixels (S14: YES), the CPU 71 proceeds to S411. In S411, the CPU 71 may read out the RGB values of the complementary color of the initial conversion-scheduled color from the flash ROM 73, store the same in the RAM 74 as a background color conversion color by which the background color is converted, i.e., set the background color conversion color with the RGB values of the complementary color of the initial conversion-scheduled color, and then proceed to S21.

Thereby, when a pixel in the non-background color area adjacent to the background color area is approximate to the preset initial conversion-scheduled color, the CPU 71 converts the background color of the image data into the complementary color of the initial conversion-scheduled color, thereby producing an image data that is easily viewable.

(C) For example, in the illustrative embodiment, the CPU 71 executes the processes of S11 to S21 in accordance with the program stored in the flash ROM 73. However, the CPU 71 may additionally output the image data, which consists of the RGB values of the respective pixels of a page unit input from the line sensor driving circuit 65, to the PC 81 or server, which is not shown, connected via a network, which is not shown, through the communication interface 75. The PC 81 or server, which is not shown, may execute the processes of S11 to S21.

(D) For example, the program shown by the flowcharts of FIGS. 5 to 7 and the various parameters such as RGB values of the initial conversion-scheduled color, RGB values of the complementary color of the initial conversion-scheduled color, threshold value ratio and color-difference threshold value may be stored in a portable storage medium, for example, an SD memory card, having a flash memory mounted thereto or a storage medium such as CD-ROM and DVD-ROM. Also, the CPU 71 may read out the program and the like, which are stored in the portable storage medium or storage medium such as CD-ROM and DVD-ROM, through a data read unit, which is not shown, and store the read out program and the like in the flash ROM 73.

(E) For example, in the above illustrative embodiment, the process is performed using the color space of an RGB color system. However, the invention is not limited thereto. For instance, even when the same process is performed using a CMY color system or XYZ color system, it is possible to obtain the image data that is easily viewable, like the process in which the RGB color system is used.

What is claimed is:
1. An image processing apparatus comprising:
a background color acquiring unit that acquires a background color based on color data of pixels included in image data;
an area acquiring unit that acquires a background color area including a pixel having color data of the background color, based on the image data;
a determining unit that determines whether the background color area acquired by the area acquiring unit is adjacent to a non-background color area outside of the background color area, the non-background color area including a pixel having color data of a first color that is preset so that the color data of the pixel in the background color area can be converted thereto; and
a converting unit that converts the color data of the pixel in the background color area into the first color when the determining unit determines that the background color area is not adjacent to the non-background color area which includes the pixel having the color data of the first color, and converts the color data of the pixel in the background color area into a second color which is different from the first color when the determining unit determines that the background color area is adjacent to the non-background color area which includes the pixel having the color data of the first color.

2. The image processing apparatus according to claim 1, further comprising a counting unit that extracts and counts an inappropriate pixel which is adjacent to a pixel having color data approximate to the first color, among the pixels included in the background color area,
wherein the determining unit determines that the background color area is adjacent to the non-background color area when a count value of the inappropriate pixel, which is counted by the counting unit, is equal to or larger than a change threshold value, and determines that the background color area is not adjacent to the non-background color area when the count value of the inappropriate pixel, which is counted by the counting unit, is smaller than the change threshold value.

3. The image processing apparatus according to claim 1, further comprising a minimum color-difference acquiring unit that acquires a minimum color-difference of color-differences between each color data of each pixel included in the non-background color area adjacent to the background color area and the first color,
wherein when the determining unit determines that the background color area is adjacent to the non-background color area and the minimum color-difference is equal to or smaller than a color-difference threshold value, the converting unit converts the color data of the pixel in the background color area into the second color.

4. The image processing apparatus according to claim 1, wherein when the determining unit determines that the background color area is adjacent to the non-background color area, the converting unit converts the color data of the pixel in the background color area into the second color that is a complementary color of the first color.

5. An image scanning apparatus comprising:
an image scanning unit that scans an image of a sheet, and the image processing apparatus according to claim 1 that performs image processing for the image scanned by the image scanning unit.

6. An image processing method comprising:

acquiring a background color based on color data of pixels included in image data;

acquiring a background color area including a pixel having color data of the background color based on the image data;

determining whether the background color area is adjacent to a non-background color area outside of the background color area, the non-background color area including a pixel having color data of a first color that is preset so that the color data of the pixel in the background color area can be converted thereto; and converting the color data of the pixel in the background color area into the first color when it is determined that the background color area is not adjacent to the non-background color area which includes the pixel having color data of the first color, and converting the color data of the pixel in the background color area into a second color which is different from the first color when it is determined that the background color area is adjacent to the non-background color area which includes the pixel having color data of the first color.

7. An image processing apparatus comprising:

an acquiring unit that acquires a background color based on color data of pixels included in image data;

a first determining unit that determines, for each pixel included in the image data, whether the pixel belongs to a first set of pixels or a second set of pixels, the color data of each pixel belonging to the first set of pixels is the background color acquired by the acquiring unit, the color data of each pixel belonging to the second set of pixels is not the background color acquired by the acquiring unit, and the second set of pixels including at least one pixel of color data of a first color;

a second determining unit that determines, for each pixel belonging to the first set of pixels, whether the pixel is adjacent to a pixel belonging to the second set of pixels;

a third determining unit that determines whether a color data of the pixel belonging to the second set of pixels, which is determined by the second determining unit to be adjacent to the pixel belonging to the first set of pixels, is approximate to the first color;

a counting unit that counts a number of pixels belonging to the first set of pixels that is adjacent to the pixel belonging to the second set of pixels which is determined by the third determining unit that the color data thereof is approximate to the first color;

a fourth determining unit that determines whether the number of pixels counted by the counting unit is equal to or larger than a threshold value; and a converting unit that converts the color data of each pixel belonging to the first set of pixels into the first color when the fourth determining unit determines that the number of pixels counted by the counting unit is smaller than the threshold value, and converts the color data of each pixel belonging to the first set of pixels into a second color which is different from the first color when the fourth determining unit determines that the number of pixels counted by the counting unit is equal to or larger than the threshold value.

8. The image processing apparatus according to claim 7, wherein the third determining unit determines that the color data of the pixel belonging to the second set of pixels is approximate to the first color when a difference between the color data of the pixel belonging to the second set of pixels and a color data of the first color is within a predetermined range.

* * * * *